(12) United States Patent
Stubbs et al.

(10) Patent No.: US 8,850,388 B2
(45) Date of Patent: Sep. 30, 2014

(54) CONTROLLING APPLICATION FEATURES

(75) Inventors: Paul Stubbs, Redmond, WA (US); Eric S. Schnepp, Woodinville, WA (US); Peter J. Torr, Redmond, WA (US); John A. Shepard, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1626 days.

(21) Appl. No.: 11/470,896

(22) Filed: Sep. 7, 2006

(65) Prior Publication Data

US 2008/0127053 A1    May 29, 2008

(51) Int. Cl.
*G06F 9/44* (2006.01)

(52) U.S. Cl.
CPC ... *G06F 8/38* (2013.01); *G06F 8/71* (2013.01)
USPC .......................................................... 717/107

(58) Field of Classification Search
None
See application file for complete search history.

(56) References Cited

U.S. PATENT DOCUMENTS

| | | | |
|---|---|---|---|
| 5,432,903 A | 7/1995 | Frid-Nielsen | |
| 5,530,883 A * | 6/1996 | Baum et al. | 712/18 |
| 5,628,016 A | 5/1997 | Kukol | |
| 5,724,033 A * | 3/1998 | Burrows | 341/76 |
| 5,815,712 A * | 9/1998 | Bristor et al. | 717/125 |
| 5,862,379 A | 1/1999 | Rubin et al. | |
| 5,950,000 A | 9/1999 | O'Leary et al. | |
| 5,956,036 A | 9/1999 | Glaser et al. | |
| 5,995,756 A | 11/1999 | Herrmann | |
| 6,006,034 A | 12/1999 | Heath et al. | |
| 6,108,661 A | 8/2000 | Caron et al. | |
| 6,226,788 B1 | 5/2001 | Schoening et al. | |
| 6,246,404 B1 | 6/2001 | Feigner et al. | |
| 6,292,668 B1 * | 9/2001 | Alanara et al. | 455/466 |
| 6,314,559 B1 | 11/2001 | Sollich | |
| 6,393,437 B1 | 5/2002 | Zinda et al. | |
| 6,434,740 B1 | 8/2002 | Monday et al. | |
| 6,446,097 B1 | 9/2002 | Glaser | |
| 6,449,660 B1 | 9/2002 | Berg et al. | |
| 6,493,868 B1 | 12/2002 | DaSilva et al. | |
| 6,502,233 B1 | 12/2002 | Vaidyanathan et al. | |
| 6,578,045 B1 | 6/2003 | Gray et al. | |
| 6,584,453 B1 * | 6/2003 | Kaplan et al. | 705/39 |
| 6,584,480 B1 | 6/2003 | Ferrel et al. | |
| 6,591,244 B2 | 7/2003 | Jim et al. | |
| 6,601,233 B1 | 7/2003 | Underwood | |
| 6,609,246 B1 | 8/2003 | Guhr et al. | |

(Continued)

OTHER PUBLICATIONS

Kurniawan, Donny et al., "An IDE Framework for Grid Application Development," IEEE 2008, pp. 184-191.

(Continued)

*Primary Examiner* — Jason Mitchell
(74) *Attorney, Agent, or Firm* — Kevin Sullivan; Leonard Smith; Micky Minhas

(57) ABSTRACT

A facility is provided for controlling application features. In various embodiments, the facility assembles an indication of features, starts a controlled application, and provides the assembled indication of features to the controlled application so that the controlled application can disable a feature of the controlled application. The facility can include a controlling application that is adapted for assembling a set of tokens that identify features by adding or removing tokens when a user of the controlling application selects a command associated with the controlling application, and a controlled application that, when invoked by the controlling application and provided the assembled set of tokens, controls a feature of the controlled application based on the assembled set of tokens.

23 Claims, 14 Drawing Sheets

(56) References Cited

U.S. PATENT DOCUMENTS

| | | |
|---|---|---|
| 6,625,804 B1 | 9/2003 | Ringseth et al. |
| 6,675,228 B1 | 1/2004 | Bahrs et al. |
| 6,718,535 B1 | 4/2004 | Underwood |
| 6,742,175 B1 | 5/2004 | Brassard et al. |
| 6,799,718 B2 | 10/2004 | Chan et al. |
| 6,938,239 B2 | 8/2005 | McDermott et al. |
| 6,944,829 B2 | 9/2005 | Dando |
| 6,965,990 B2 | 11/2005 | Barsness et al. |
| 6,968,538 B2 | 11/2005 | Rust et al. |
| 7,000,220 B1 | 2/2006 | Booth |
| 7,020,697 B1 | 3/2006 | Goodman et al. |
| 7,032,219 B2 | 4/2006 | Mowers et al. |
| 7,178,129 B2 | 2/2007 | Katz |
| 7,188,333 B1 | 3/2007 | LaMotta et al. |
| 7,197,744 B2 * | 3/2007 | Hostettler ............ 717/125 |
| 7,240,323 B1 | 7/2007 | Desai et al. |
| 7,281,236 B1 | 10/2007 | Galvin et al. |
| 7,281,245 B2 | 10/2007 | Reynar et al. |
| 7,289,964 B1 | 10/2007 | Bowman-Amuah |
| 7,392,510 B1 * | 6/2008 | Treder et al. ............ 717/128 |
| 7,392,522 B2 | 6/2008 | Murray et al. |
| 7,516,447 B2 | 4/2009 | Marvin et al. |
| 7,530,079 B2 | 5/2009 | Stubbs et al. |
| 7,543,244 B2 * | 6/2009 | Matthews et al. ............ 715/811 |
| 7,552,418 B2 | 6/2009 | Saad et al. |
| 7,636,912 B2 | 12/2009 | Saad et al. |
| 7,653,893 B2 | 1/2010 | Neumann et al. |
| 7,665,062 B1 | 2/2010 | Bauer et al. |
| 7,669,183 B2 | 2/2010 | Bowman et al. |
| 7,676,785 B2 | 3/2010 | Loksh et al. |
| 7,716,640 B2 | 5/2010 | Pik et al. |
| 7,725,873 B2 | 5/2010 | Shepard et al. |
| 7,810,080 B2 | 10/2010 | Plum et al. |
| 7,818,719 B2 | 10/2010 | Meijer et al. |
| 7,908,580 B2 | 3/2011 | Stubbs et al. |
| 8,423,889 B1 * | 4/2013 | Zagorie et al. ............ 715/255 |
| 2002/0041289 A1 | 4/2002 | Hatch et al. |
| 2002/0049753 A1 * | 4/2002 | Burrows ............ 707/3 |
| 2002/0070977 A1 | 6/2002 | Morcos et al. |
| 2002/0156688 A1 * | 10/2002 | Horn et al. ............ 705/26 |
| 2002/0184610 A1 | 12/2002 | Chong et al. |
| 2003/0014389 A1 | 1/2003 | Hashimoto et al. |
| 2003/0074217 A1 | 4/2003 | Beisiegel et al. |
| 2003/0167358 A1 | 9/2003 | Marvin et al. |
| 2003/0172076 A1 | 9/2003 | Arnold et al. |
| 2003/0182294 A1 * | 9/2003 | Kamen et al. ............ 707/100 |
| 2004/0003371 A1 | 1/2004 | Coulthard et al. |
| 2004/0015837 A1 | 1/2004 | Worthington et al. |
| 2004/0128169 A1 * | 7/2004 | Lusen ............ 705/3 |
| 2004/0158811 A1 | 8/2004 | Guthrie et al. |
| 2004/0172623 A1 | 9/2004 | Eckels et al. |
| 2004/0188511 A1 | 9/2004 | Sprigg et al. |
| 2004/0193599 A1 | 9/2004 | Liu et al. |
| 2004/0193682 A1 | 9/2004 | Deboer et al. |
| 2004/0205200 A1 | 10/2004 | Kothari et al. |
| 2004/0205708 A1 | 10/2004 | Kothari et al. |
| 2004/0225995 A1 | 11/2004 | Marvin et al. |
| 2005/0066304 A1 | 3/2005 | Tattrie et al. |
| 2005/0114475 A1 | 5/2005 | Chang et al. |
| 2005/0138034 A1 | 6/2005 | Faraj |
| 2005/0149911 A1 | 7/2005 | Nadon et al. |
| 2005/0183059 A1 | 8/2005 | Loksh et al. |
| 2005/0262432 A1 | 11/2005 | Wagner |
| 2005/0278695 A1 | 12/2005 | Synovic |
| 2006/0075352 A1 | 4/2006 | Burke et al. |
| 2006/0080329 A1 | 4/2006 | Skibo et al. |
| 2006/0080468 A1 | 4/2006 | Vadlamani et al. |
| 2006/0080639 A1 | 4/2006 | Bustelo et al. |
| 2006/0111888 A1 | 5/2006 | Hiew et al. |
| 2006/0117320 A1 | 6/2006 | Garms et al. |
| 2006/0130038 A1 | 6/2006 | Claussen et al. |
| 2006/0135196 A1 * | 6/2006 | Oh et al. ............ 455/550.1 |
| 2006/0156272 A1 | 7/2006 | Goncharenko et al. |
| 2007/0156785 A1 * | 7/2007 | Hines et al. ............ 707/203 |
| 2007/0168913 A1 | 7/2007 | Sarukkai et al. |
| 2008/0127054 A1 | 5/2008 | Stubbs et al. |
| 2008/0127055 A1 | 5/2008 | Davis et al. |
| 2010/0185825 A1 * | 7/2010 | Abzarian et al. ............ 711/163 |

OTHER PUBLICATIONS

Lucia, Andrea et al., "Improving Context Awareness in Subversion through Fine-Grained Versioning of Java Code," IWPSE, Sep. 3-4, 2007, Dubrovnic, Croatia, pp. 110-113.

Paige, Richard et al., "Metamodel-Based Model Conformance and Multiview Consistency Checking," ACM Transactions on Software Engineering Methodology, Jul. 2007, vol. 16, No. 3, pp. 1-49.

Randall, Brian "Visual Studio Tools for the Microsoft Office System," MCW Technologies LLC., Apr. 2003, pp. 1-13.

Tratt, Laurence "Compile-time meta-programming in a dynamically typed OO language," ACM DLS, Oct. 18, 2005, San Diego, CA, pp. 49-63.

U.S. Appl. No. 11/470,863, Stubbs et al.

U.S. Appl. No. 11/470,909, Stubbs et al.

U.S. Appl. No. 11/470,959, Davis et al.

"MetaWare IDE," ©2007 ARC International, http://www.arc.com/software/development/metawareides.html.

"Take a tour on PhpED IDE features," NuSphere, ©2006 NuSphere Corporation, http://www.nusphere.com/products/tour.htm.

"Working with Xcode: Building Applications for the Future," Updated Mar. 7, 2006, Developer Connection, Tools, ©2007 Apple Inc., http://developer.apple.com/tools/xcode/xcodefuture.html.

Atsuta, Satoshi and Saeko Matsuura, "eXtreme Programming Support Tool in Distributed Environment," COMPSAC Workshops, 2004, pp. 32-33.

Bowman, Ivan, "An Architectural Investigation: Extracting Architectural Facts From a Large Software System," Apr. 7, 1998, Department of Computer Science, University of Waterloo Paper, http://plg.uwaterloo.ca/~itbowman/CS746G/proj/Project.html.

des Rivieres, J. and J. Wiegand, "Eclipse: A platform for integrating development tools," IBM Systems Journal, vol. 43, No. 2, 2004, ©2004 IBM, pp. 371-383.

Hupfer, Susanne et al., "Introducing Collaboration into an Application Development Environment," CSCW'04, Nov. 2004, Chicago, Illinois, vol. 6, Issue 3, ©2004 ACM, pp. 21-24.

Kurbel, Karl, Andrzej Dabkowski and Piotr Zajac, "Software Technology for WAP Based M-commerce—A Comparative Study of Toolkits for the Development of Mobile Applications," Proceedings of the International Conference WWW/Internet 2002, Lisbon, Portugal, Nov. 2002, pp. 673-680.

MacFarlane, Ian A. and Ian Reilly, "Requirements Traceability in an Integrated Development Environment," ©1995 IEEE, pp. 116-123.

Mehra, Dr. Anshu and Dr. Virginio Chiodini, "An Integrated Development Environment for Distributed Multi-Agent Applications," ©1998 IEEE, pp. 451-452.

Slovak, Ken, Chris Burnham and Dwayne Gifford, "Chapter 7 COM Add-ins," Professional Outlook 2000 Programming: With VBA, Office and CDO, ISBN 1-861003-31-5, Wrox Press, 1999, pp. 247-290.

Szczur, Martha R. and Sheppard, Sylvia B., "TAE Plus: Transportable Applications Environment Plus: A User Interface Development Environment", ACM Transactions on Information Systems, vol. 11, No. 1, Jan. 1993, ©1993 ACM pp. 76-101.

Watson, Gregory R. and Craig E. Rasmussen, "A Strategy for Addressing the Needs of Advanced Scientific Computing Using Eclipse as a Parallel Tools Platform," Dec. 2005, Los Alamos National Laboratory, Los Alamos, New Mexico, White Paper, LA-UR-05-9114, pp. 1-12.

Brockschmidt, Kraig, OLE Integration Technologies: A Technical Overview, Microsoft Corporation, Oct. 1994, 17 pages.

Brown, Kemp, "Visual Studio 6.0 Extensibility Fundamentals," Microsoft Corporation—MSDN, Jan. 1999, 9 pages.

Cheng et al., "Building Collaboration into IDEs," Dec. 2003, pp. 40-50.

Final Office Action for U.S. Appl. No. 10/779,298 mailed Jun. 25, 2008, 20 pages.

(56) References Cited

OTHER PUBLICATIONS

Jordan et al., "Facilitating the development of representations in hypertext with IDE," Hypertext 1999 Proceedings, Nov. 1999, pp. 93-104.

Lintern et al., "Plugging-in visualization: experiences integrating a visualization tool with Eclipse," ACM Symposium on Software Visualization, San Diego, CA, Jun. 2003, pp. 47-56.

Luer, C. and D.S. Rosenblum, WREN—an Environment for Component-based Development. Proceedings of 8th European Software Engineering Conference, pp. 207-217, 2001.

Milasinovic, G., "European Search Report for Application No. EP05100577," Munich, mailed Jul. 15, 2005, 3 pages.

Non-Final Office Action for U.S. Appl. No. 10/779,298 mailed Dec. 26, 2007, 17 pages.

Non-Final Office Action for U.S. Appl. No. 10/779,298, mailed Feb. 19, 2009, 18 pages.

Notice of Allowance for U.S. Appl. No. 10/779,298 mailed Nov. 16, 2009, 7 pages.

Reiss, S.P., "The Desert Environment," ACM Transactions on Software Engineering, vol. 8, Issue 4, 1999, pp. 1-46.

Robbins, John, Extending the Visual Studio .Net IDE, MSDN Magazine, Jan. 2002, 6 pages.

\* cited by examiner

CONTROLLING APPLICATION FEATURES

CROSS-REFERENCE TO RELATED APPLICATION(S)

This patent application is related to U.S. patent application Ser. No. 11/470,959, entitled "APPLICATION PROXY," U.S. patent application Ser. No. 11/470,863, now U.S. Pat. No. 7,530,079 issued on May 5, 2009, entitled "MANAGING APPLICATION CUSTOMIZATION," and U.S. patent application Ser. No. 11/470,909 entitled "CONNECTING WITH AN APPLICATION INSTANCE," which applications are being filed concurrently and which are hereby incorporated by reference in their entireties.

BACKGROUND

Software developers generally use integrated development environments ("IDEs") to edit, build, and debug applications. An example of an IDE is MICROSOFT VISUAL STUDIO, which is a software development tool that is provided by MICROSOFT CORPORATION. IDEs provide a user interface that developers can use to develop software components and applications. IDEs generally include developer tools, such as a source code editor, a compiler and/or interpreter, a build-automation tool, and a debugger. IDEs may also include a version control system and other tools to simplify construction of a graphical user interface ("GUI").

IDEs can have various containers for constituents of applications, such as image files, source code files, libraries, and so forth. As examples, IDEs can have solution and project containers. A solution container can contain, among other things, one or more project containers. The project containers can contain constituents of applications. The constituents of the applications can be "built" by the IDE's developer tools (e.g., compiler), such as by translating human-readable source code to machine-executable object code. Each project container can be said to be a different project type because it can provide support for a different programming language. Examples of programming languages are C#, C++, MICROSOFT VISUAL BASIC, PERL, and so forth. A project container (or simply, "a project") is generally defined by a project file. The project file can indicate items associated with the project, such as various properties associated with the project, files that define the components the project contains, and so forth.

Developers employ IDEs to build software components, such as controls and add-ins. A control is generally a component that a developer adds to a form to enable or enhance a user's interaction with the form. As an example, a developer can add a Portable Document Format ("PDF") reader control to a web form so that a viewer of the web form can view a PDF document. An add-in is a component that a user can add to an application ("host application") to supplement the host application's functionality. As an example, a user can use an add-in with a MICROSOFT OFFICE host application (e.g., MICROSOFT WORD) to create a PDF document based on contents of the host application.

The IDE starts either when a user commands it to start or when an application starts it. As an example, when an add-in encounters an unexpected or specified condition, such as when an add-in encounters an error or a specified breakpoint, it can start the IDE. A breakpoint is a point in executable code at which a user has indicated to suspend execution. When the add-in encounters an error or breakpoint, the add-in can invoke the IDE and identify a region of source code within which the error or breakpoint can be found. If the IDE is not already executing when the add-in invokes it, the IDE will start. The IDE will then locate the relevant source code and display the identified region. Alternatively, an application can start the IDE, such as when the user selects a command for editing code associated with the application. Examples of code that can be associated with an application include source code, object code, scripts, macros, and so forth. Macro code is code that a user can write to control the application. Some applications provide a "macro recording" feature, using which users can generate macro code merely by commanding the application to perform various actions.

When an application starts an IDE, the IDE may be a fully featured version. However, such an IDE may provide too many features for a user of the application. For example, when the user of the application is not a professional developer, the user may not understand all the sophisticated features (e.g., a window displaying the memory contents of a C++ object) provided by the IDE. Conventional IDEs may provide so much functionality to such a user that the user is overwhelmed and unable to complete a task. The IDE may provide a blank code editor window, too many tool windows, options, and so forth.

SUMMARY

A facility is provided for controlling application features. The facility can employs a set of tokens to control an application ("controlled application"). A token is an identifier associated with one or more features of the controlled application. The tokens can be assembled by a controlling application, such as when a user invokes various commands associated with the controlling application. Assembling tokens in a set of tokens can include adding or removing tokens in the set. When the user causes the controlling application to invoke the controlled application, the controlling application can provide the assembled set of tokens to a component associated with the facility. That component causes various features of the controlled application to be enabled or disabled based on the assembled set of tokens.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1A:
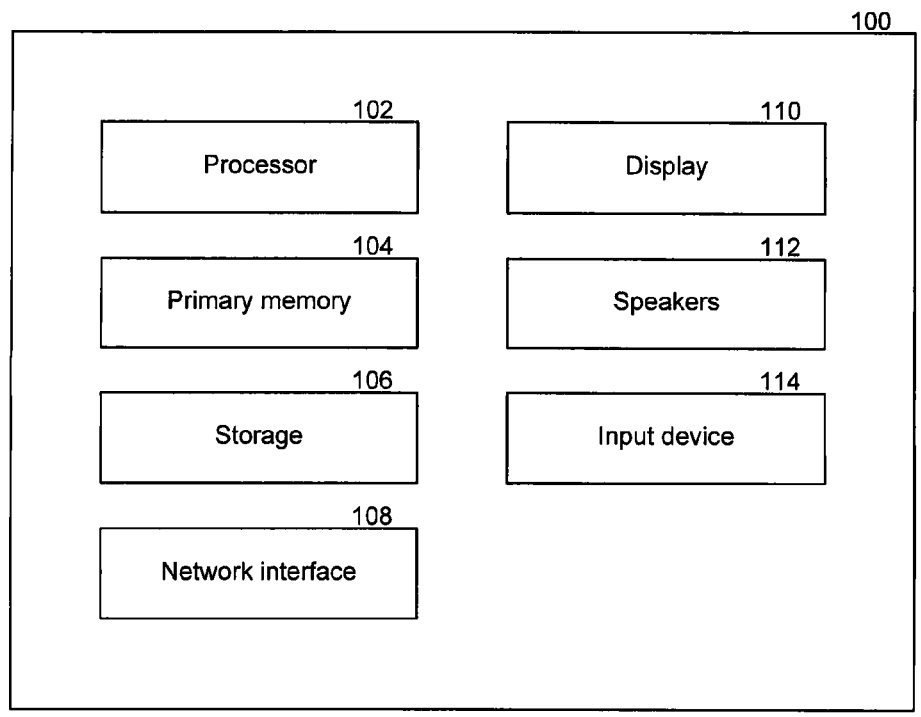
FIG. 1A is a block diagram illustrating an example of a suitable computing environment in which the facility may operate in some embodiments.

A facility is provided for controlling application features. In various embodiments, the facility employs a set of tokens to enable one application ("controlling application") to control another application ("controlled application"). A token is an identifier associated with one or more features of the controlled application. Multiple tokens can also be employed to reference source code, such as source code that should be inserted into a code editor. The tokens can be assembled by a controlling application, such as when a user invokes various commands associated with the controlling application. Assembling a set of tokens can include adding or removing tokens in the set. When the user causes the controlling application to invoke the controlled application, the controlling application can provide the assembled set of tokens to a component associated with the facility. That component causes various features of the controlled application to be enabled or disabled. As an example, when a user commands MICROSOFT EXCEL to take various actions, a component associated with MICROSOFT EXCEL can assemble tokens. When MICROSOFT EXCEL starts the IDE, it provides the set of assembled tokens to the IDE. Upon starting, the IDE can evaluate the set of tokens to enable or disable various features. As examples, the IDE can insert portions of source code into a code editor, add objects or controls to a form, provide help relating to a task, enable or disable various "tool windows" that provide development tools, enable or disable various menus, create or open projects, and generally customize the IDE. The tokens can also be based on the user's network credentials, time of day, past interactions, and so forth. Thus, the facility enables one application to control another application's features.

Because the controlling application can provide source code that the controlled application is to insert into its code editor, users may no longer need to employ the controlling application's macro recording feature to generate source code that they revise. Thus, the facility can be employed with controlling applications that do not provide a macro recording feature so that users can more easily construct macro code.

The facility can operate with an application proxy that is capable of customizing an integrated development environment. The application proxy may execute in-process with the integrated development environment. In various embodiments, the IDE loads the application proxy when the IDE loads a project that indicates that an application proxy should be loaded to communicate with an identified application. The application proxy can start or connect with the application and handles communications between the IDE and the identified application. The application proxy can batch or logically combine inter-process communications calls. As an example, when the application creates a toolbar button in the IDE, the application can make one inter-process communications call to the application proxy to command it to create the button. The application proxy then makes the toolbar visible if it is not, creates and positions a button, sets the button's various properties, and attaches it to the toolbar. Without the application proxy, the application would have to make several inter-process communications calls to command the IDE to take these steps, thereby decreasing performance of the IDE.

In some embodiments, a software developer that develops an application proxy can do so without having to provide logic to handle multiple project types. This is so because each project provides an indication to the IDE of the application proxies that correspond to the project. Because the IDE loads application proxies that are indicated to be associated with projects the IDE loads, the IDE will not load an application proxy that has not been identified in a project. Thus a developer of an application proxy may not need to provide logic for handling conditions associated with a project type with which the application proxy is not designed to function. As an example, a developer of an application proxy for MICROSOFT EXCEL may not need to provide logic for handling a MICROSOFT VISUAL C++ project type.

Once the application proxy is loaded, it can customize the IDE. As examples, it can indicate menu options to show or hide; toolbars to make available or disable; windows to make visible, available, or unavailable; commands to enable or disable; colors for various portions of the IDE, positions of windows, commands, and toolbars; and so forth.

In some embodiments, the application proxy can manipulate source or object code. As examples, the application proxy can add, remove, or modify source or object code. The application proxy can add source code when, for example, the user places an object (e.g., pushbutton or other user interface control) on a form. The user could then provide additional code to hook up the source code added by the application proxy to other logic associated with the object the user added.

An application proxy can retrieve properties from a "property bag" stored in the project(s) with which the application proxy is associated. A property bag is a collection of properties. The application proxy can also store properties in these property bags and modify these properties. An example of a property is a location indicator that identifies a location from which the IDE or application proxy can retrieve additional components associated with the project. As an example, the location indicator can identify a database location, uniform resource locator ("URL"), or other location from which the IDE or application proxy can retrieve additional components.

The facility is described in more detail in reference to the Figures. FIG. 1A is a block diagram illustrating an example of a suitable computing environment 100 in which the facility may be implemented. A system for implementing the facility includes a general purpose computing device in the form of the computing system ("computer") 100. Components of the computer 100 may include, but are not limited to, a processing unit 102, a system primary memory 104, a storage unit 106, a network interface or adapter 108, a display 110, one or more speakers 112, and an input device 114.

The computer 100 typically includes a variety of computer-readable media that are operable with the storage unit 106.

Computer-readable media can be any available media that can be accessed by the computer 100 and include both volatile and nonvolatile media and removable and nonremovable media.

The computer 100 may operate in a networked environment using logical connections to one or more remote computers. A remote computer may be a personal computer, a server, a router, a network PC, a peer device, or other common network node, and typically includes many or all of the elements described above in relation to the computer 100. A logical connection can be made via a local area network (LAN) or a wide area network (WAN), but may also be made via other networks. Such networking environments are commonplace in homes, offices, enterprisewide computer networks, intranets, and the Internet. The computer 100 can be connected to a network through the network interface 108, such as to a wired or wireless network.

The computer 100 is only one example of a suitable computing environment and is not intended to suggest any limitation as to the scope of use or functionality of the facility. Neither should the computing system environment be interpreted as having any dependency or requirement relating to any one or a combination of the illustrated components.

The facility is operational with numerous other general purpose or special purpose computing system environments or configurations. Examples of well-known computing systems, environments, and/or configurations that may be suitable for use with the facility include, but are not limited to, personal computers, server computers, handheld or laptop devices, cellular telephones, tablet devices, multiprocessor systems, microprocessor-based systems, set-top boxes, programmable consumer electronics, network PCs, minicomputers, mainframe computers, distributed computing environments that include any of the above systems or devices, and the like.

The facility may be described in the general context of computer-executable instructions, such as program modules, that are executed by a computer. Generally, program modules include routines, programs, objects, components, data structures, and so forth that perform particular tasks or implement particular abstract data types. The facility may also be employed in distributed computing environments where tasks are performed by remote processing devices that are linked through a communications network. In a distributed computing environment, program modules may be located in local and/or remote computer storage media, including memory storage devices.

Figure 1B:
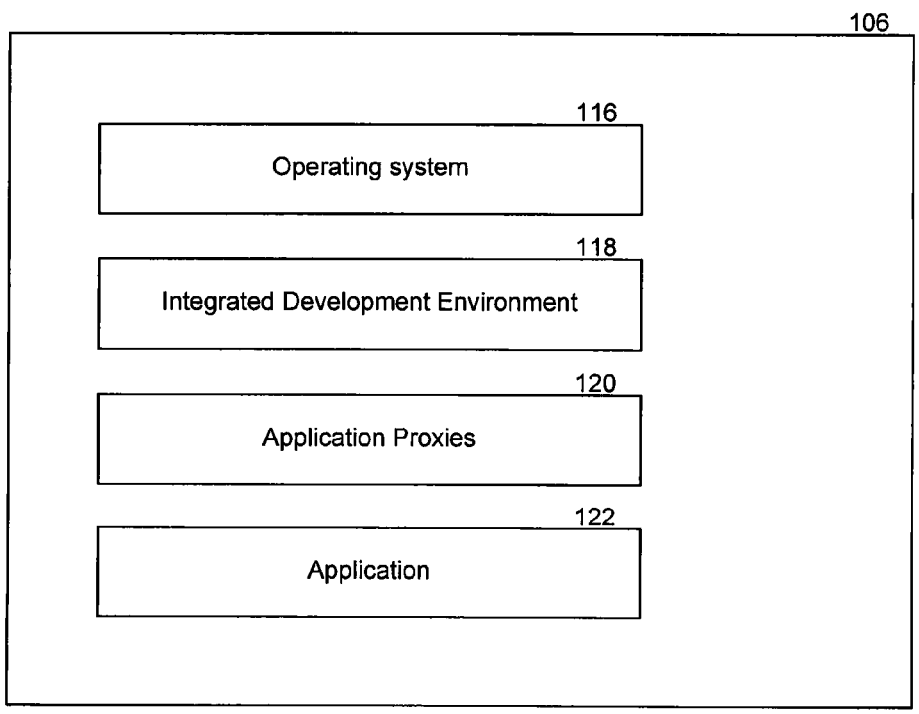
FIG. 1B is a block diagram illustrating a storage unit of FIG. 1A in further detail in some embodiments.

FIG. 1B is a block diagram illustrating a storage unit of FIG. 1A in further detail in some embodiments. According to the illustrated embodiment, the storage unit 106 stores an operating system 116, an IDE 118, one or more application proxies 120, and an application 122. The IDE can be any IDE that a software developer can employ during development, such as MICROSOFT VISUAL STUDIO. In some embodiments, the IDE may provide a common framework that can be customized for various uses. As an example, a version of MICROSOFT VISUAL STUDIO can be employed with MICROSOFT OFFICE to create, modify, or debug macros. Macros are series of instructions that can command an application to complete a task. The application proxies can be associated with one or more IDE projects. A project can identify one or more application proxies that the IDE is to load when it loads the project. The application can be any application that is configured for use with an IDE, such as an application that functions with add-ins, macros, and so forth. Examples of such applications are MICROSOFT WORD, MICROSOFT EXCEL, MICROSOFT OUTLOOK, and others. Applications that are not developed by MICROSOFT CORPORATION can also function with IDEs. These applications may be associated with one or more application proxies and IDE projects.

While various functionalities and data are shown in FIGS. 1A and 1B as residing on particular computer systems that are arranged in a particular way, those skilled in the art will appreciate that such functionalities and data may be distributed in various other ways across computer systems in different arrangements. While computer systems configured as described above are typically used to support the operation of the facility, those skilled in the art will appreciate that the facility may be implemented using devices of various types and configurations, and having various components.

The techniques can be described in the general context of computer-executable instructions, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

Figure 2A:
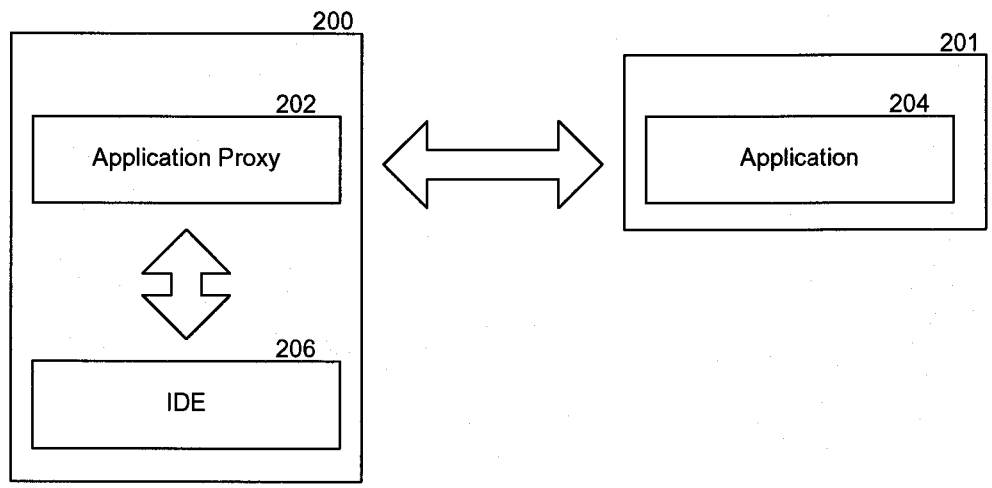
FIG. 2A is a block diagram illustrating communications flows between various components associated with the facility in various embodiments.

FIG. 2A is a block diagram illustrating communications flows between various components associated with the facility in various embodiments. A process space 200 includes an IDE 206 and one or more application proxies 202. The IDE loads the application proxies that correspond to the application(s) 204 with which the IDE communicates, such as an application that is identified in a project the IDE opens. The application generally executes in a process space 201 that is separate from the IDE's process space. When multiple applications execute, they each may operate in their own process space. Communications between process space 201 and process space 200 are referred to as inter-process communications. The processes can execute on the same or different computing devices, but may nevertheless be able to communicate using inter-process communications. Techniques for inter-process communications include message passing, synchronization, shared memory, remote procedure calls, and so forth. The facility can employ any technique employed in the art to enable processes to communicate with each other.

In some embodiments, the application may communicate with the application proxy, the IDE, or both. As an example, the application may communicate some commands to the application proxy and other commands directly to the IDE. When the application proxy is not compatible with the application, such as because they have different version numbers, the application may be able to communicate more effectively with the IDE than with the application proxy. Thus, while IDE performance may deteriorate, no functionality is lost.

Components within a process space can communicate with each other, such as by invoking each other's application program interfaces ("APIs"). As an example, the application proxy and IDE can communicate with each other. Another way a component can communicate with another component within a process space is to implement specific interfaces expected by the other component. Alternatively, the components may employ any other known mechanism for intra-process communications.

Figure 2B:
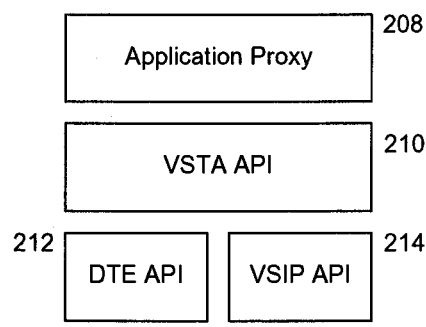
FIG. 2B is a block diagram illustrating a component stack associated with the facility in some embodiments.

FIG. 2B is a block diagram illustrating a component stack associated with the facility in some embodiments. The component stack describes components that generally communicate with one another. As an example, components that are adjacent in the diagram may communicate with one another to complete various tasks. An application proxy 208 that is loaded by an IDE when the IDE loads a project can employ a Visual Studio Tools for Applications ("VSTA") API 210.

VSTA is an environment for application customization that is built on the MICROSOFT .NET ("dot-NET") framework. Application developers can employ various programming languages to customize applications that support VSTA. As an example, a developer can employ either MICROSOFT VISUAL BASIC or MICROSOFT VISUAL C# to customize versions of MICROSOFT EXCEL that support VSTA. A VSTA component provides an API that the application proxy can use to command an IDE that supports VSTA, such as MICROSOFT VISUAL STUDIO. The application proxy can invoke methods provided by the VSTA API to control the IDE, such as when the application proxy receives inter-process communications from the application. The application proxy can be implemented as an add-in to the IDE. Add-ins provide the ability to interact with most of the features and tools found in the IDE, including code editors, a code model, output and debugging windows, editors, menus, and other commonly used interfaces.

The VSTA API can employ an automation interface provided by the IDE, such as DTE API 212. DTE is the top-level automation object provided by MICROSOFT VISUAL STUDIO. Components can employ the DTE to command the IDE to take various actions, such as to open and close windows, invoke IDE commands, inject code, and so forth. VSTA is described in detail at MICROSOFT CORPORATION's web site.

The VSTA API can also employ a customization API provided by the IDE, such as the Visual Studio Industry Partners ("VSIP") API 214 provided by MICROSOFT VISUAL STUDIO. The VSIP API provides methods to customize the IDE, such as to add or remove commands, windows, user interface elements, and so forth. VSIP is described in detail at MICROSOFT CORPORATION's web site.

Thus, the application proxy is able to customize and command the IDE on behalf of the application.

Figure 3:
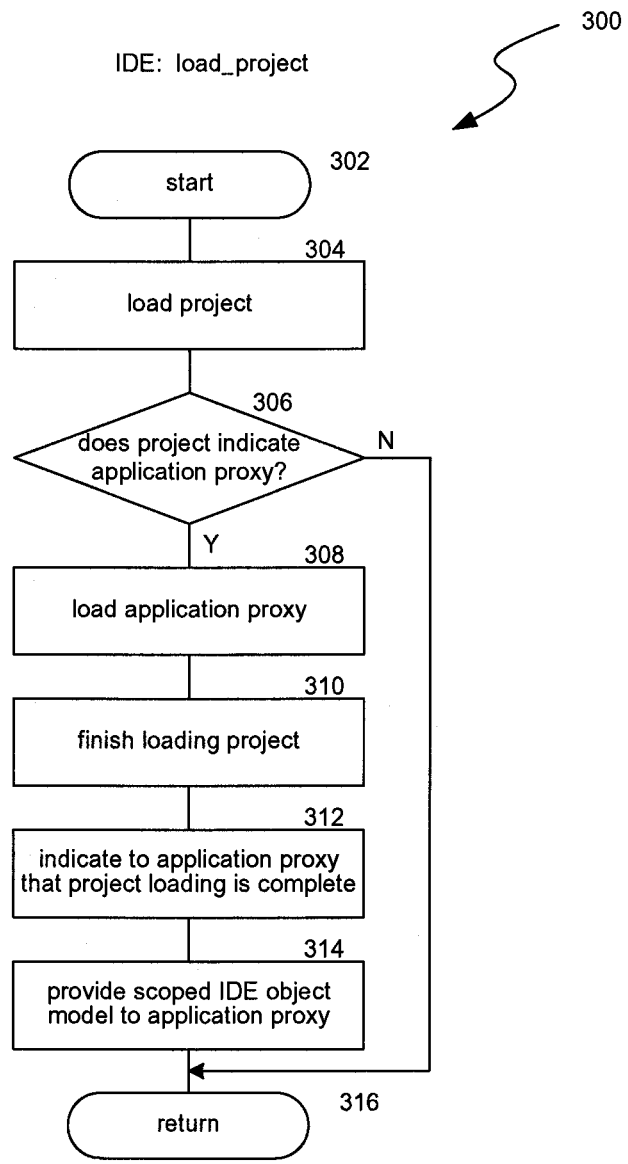
FIG. 3 is a flow diagram illustrating a load_project routine invoked by an integrated development environment in some embodiments.

FIG. 3 is a flow diagram illustrating a load_project routine invoked by an integrated development environment in some embodiments. The routine 300 can be invoked by the IDE when it loads a project, such as when a user requests the IDE to open the project. The routine begins at block 302.

At block 304, the routine loads the indicated project.

At decision block 306, the routine determines whether the project indicates an application proxy. The project can indicate an application proxy, e.g., by including a declaration for the application proxy. In various embodiments, the application proxy can be indicated using an identifier. The following Extensible Markup Language ("XML") declaration of a portion of a project file provides an example that identifies an application proxy:

```
<ProjectClient>
    <HostIdentifier>WordProcessor</HostIdentifier>
    <InProcHost>{8C1425C9-A7D3-35CD-8248-928CA52AD49B}</InProcHost>
    <HostProperties>
        <Property Name="Option1" Value="True"/>
        <Property Name="Option2" Value="Red"/>
        <Property Name="IDECustomization" Value="Yes"/>
        <Property Name="File+Open" Value="Off"/>
        ...
    </HostProperties>
</ProjectClient>
```

In this example, the application proxy's identifier is identified in an "InProcHost" element. In some embodiments, a value of this element may be a globally unique identifier that uniquely identifies the application proxy. The IDE, upon receiving this identifier, can determine a location at which the application proxy can be found, such as by looking up the value in a registry, database, or other location. Because the IDE is not provided with an executable file for the application proxy directly, it is less likely that the IDE will load malicious code because the IDE loads code that was previously installed, such as by an administrator. When the location is determined by a lookup (e.g., from a registry, database, or other location), an administrator can control not only the registry or database entry but also the location from which the application proxy is loaded. Thus, insertion of malicious code can be prevented.

In some embodiments, the project file is capable of providing executable code to the IDE, but then the IDE may load malicious code inadvertently. As an example, a user may maliciously or inadvertently insert code into a project file that the IDE will then load.

When an application proxy is installed, such as by an administrator or other user with sufficient rights, the location of the application proxy is stored, such as in a registry or database. In various embodiments, the location may be stored in several locations, so that, for example, multiple types of IDEs can access the installed application proxies. As an example, different IDEs may use different portions of a registry. In such a case the locations may be stored in several different portions of the registry.

If the project indicates an application proxy, the routine continues at block 308. Otherwise, the routine continues at block 316, where it returns.

At block 308, the routine loads the indicated application proxy. The IDE can load the indicated application proxy from the local disk or any network resource, such as a database, file server, and so forth.

At block 310, the routine completes loading the project once it has completed loading the application proxy. In various embodiments, the IDE may complete loading the project even when the application proxy has not yet been completely loaded.

At block 312, the routine sends an indication to the application proxy that project loading has completed. As an example, the routine may invoke a method provided by an API associated with the application proxy.

At block 314, the routine provides a "scoped" IDE object model to the application proxy. Scoping is a term used in the art to indicate an expansion or contraction of features that are appropriate for a given context. In various embodiments, the object model is scoped such that only commands, user interface elements, and other aspects of the IDE that are associated with the application, as indicated by the project or other configuration settings, are provided to the application proxy. By scoping the object model, components employing the object model may have access only to portions of the full object model associated with the IDE. Thus, for example, the IDE may only provide features appropriate to the loaded project.

At block 316, the routine returns.

Figure 4:
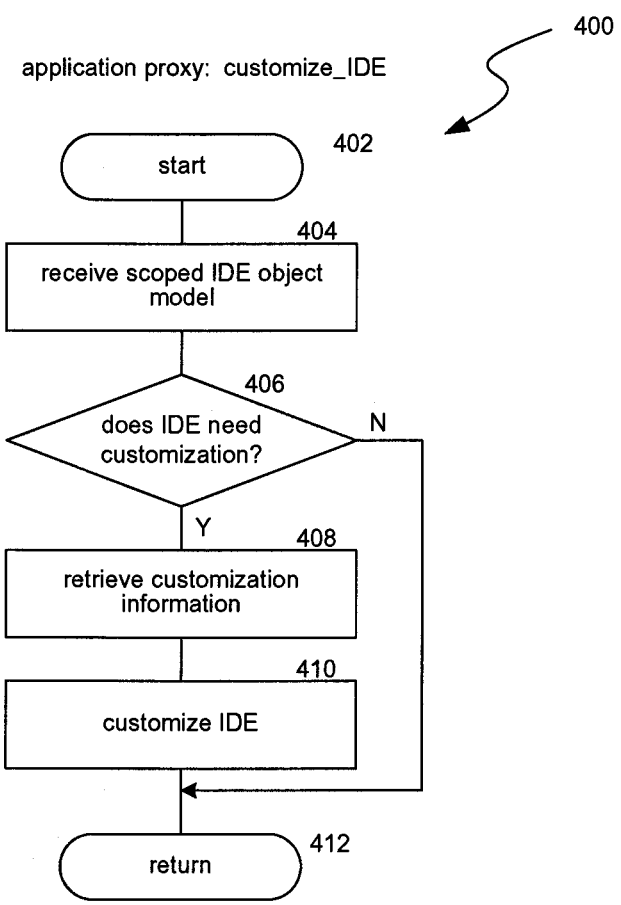
FIG. 4 is a flow diagram illustrating a customize_IDE routine invoked by an application proxy component associated with the facility in some embodiments.

FIG. 4 is a flow diagram illustrating a customize_IDE routine invoked by an application proxy component associated with the facility in some embodiments. An application proxy can invoke the routine 400 to customize the IDE, e.g., if the project or configuration settings indicate that the IDE needs customization. Examples of customization include addition or removal of commands, user interface elements, and so forth. In various embodiments, the customization may be in addition to, or instead of, the customization provided by object model scoping. The routine begins at block 402.

At block 404, the routine receives a scoped IDE object model. Scoping of the IDE object model was described above in relation to FIG. 3.

At decision block 406, the routine determines whether the IDE needs customization. As an example, the routine may determine whether the IDE needs customization based on configuration settings that are specified in the project. The routine can retrieve settings from a property bag associated with the project. The property bag can contain configuration settings or any other properties. When the IDE loads the project and instantiates an application proxy, the IDE can provide an indication of the property bag to the application proxy. If the IDE needs customization, the routine continues at block 408. Otherwise, the routine continues at block 412, where it returns.

At block 408, the routine retrieves customization information from a location identified in the project, such as in the property bag. The customization information can be stored within the property bag, elsewhere in the project file, on a database, on a file server, or elsewhere.

At block 410, the routine customizes the IDE. The routine can customize the IDE by invoking various methods provided by a VSTA API or other API associated with the IDE or facility.

At block 412, the routine returns.

Figure 5:
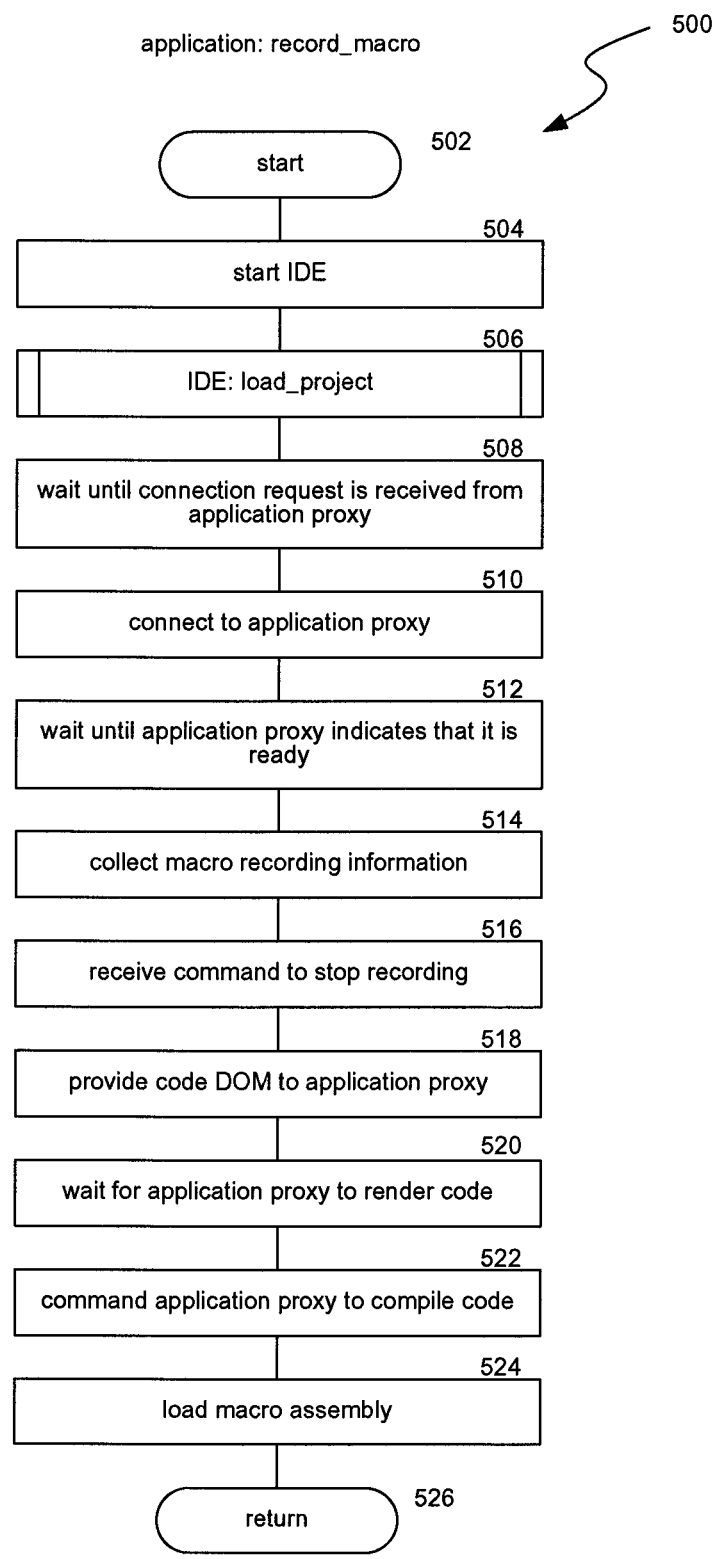
FIG. 5 is a flow diagram illustrating a record_macro routine invoked by an application in some embodiments of the facility.

FIG. 5 is a flow diagram illustrating a record_macro routine invoked by an application in some embodiments of the facility. An application can invoke the record_macro routine 500, e.g., when a user commands the application to record a macro. The routine begins at block 502.

At block 504, the routine starts the IDE. As an example, the routine may invoke a dynamic load library ("DLL") or executable file associated with the IDE.

At block 506, the routine invokes a load_project subroutine provided by the IDE. The load_project subroutine was described above in relation to FIG. 3. In various embodiments, the application may provide an indication of a project associated with the application when invoking the subroutine so that the IDE can load the indicated project. When the IDE loads the project, it may load an application proxy indicated by the project, as is described above in relation to FIG. 3. When the application proxy loads, it can send a connection request to the application.

At block 508, the routine waits until it receives a connection request from the application proxy or proxies indicated in the project. The application proxy can be indicated in the project file that the application identified when invoking the load_project subroutine at block 506. In various embodiments, instead of waiting for the connection request, the facility may provide an entry point that the application proxy invokes when the IDE has completed loading the project.

At block 510, the routine connects to the application proxy that sends a connection request. In so doing, the processes of the application and the IDE have established an inter-process communications channel so that the application can provide further commands to the IDE, such as via the application proxy.

At block 512, the routine waits until the application proxy indicates that it is ready. As an example, the application proxy can send an event or invoke a method provided by the application to indicate that the application proxy is ready to receive commands from the application.

At block 514, the routine collects macro recording information. In various embodiments, the application may record the information and provide the information later to the routine. The recording information is collected as the user performs various tasks in the application. As an example, the information can include keystrokes, menu commands invoked by the user, and so forth.

At block 516, the routine receives a command to stop recording. As an example, the user may indicate to the application to finish recording a macro.

At block 518, the routine provides a code document object model ("DOM") to the application proxy. A code DOM is a structured representation of code, such as macro code that the facility collected. The code DOM that the routine provides includes the macro recording information that was collected at block 514 or provided to the routine by the application. The code DOM is a collection of commands or instructions associated with the steps the user took while recording the macro.

At block 520, the routine waits for the application proxy to render code. The application proxy may render code by invoking various methods associated with the VSTA API or other components of the facility. The code is rendered based on the macro recording information indicated by the code DOM. The application proxy can be designed specifically for use with the application, so that it has sufficient information to render code associated with commands or instructions indicated by the code DOM.

At block 522, the routine commands the application proxy to compile the code it rendered at block 520. The application proxy may, in turn, command the IDE to compile the rendered code. When code is compiled, the IDE emits an assembly. An assembly is a sequence of instructions that components associated with the operating system can invoke. As an example, the .NET framework provides a component that can load and invoke steps indicated by an assembly. In some embodiments, other components associated with the facility are also assemblies including, e.g., application proxies.

At block 524, the routine loads the macro assembly created by the IDE when commanded by the logic of block 522. The user can then invoke the assembly, such as by commanding the IDE or the application. When the user invokes the macro, the macro may invoke an object model associated with the application, such as by using the application's automation object API.

At block 526, the routine returns.

Figure 6:
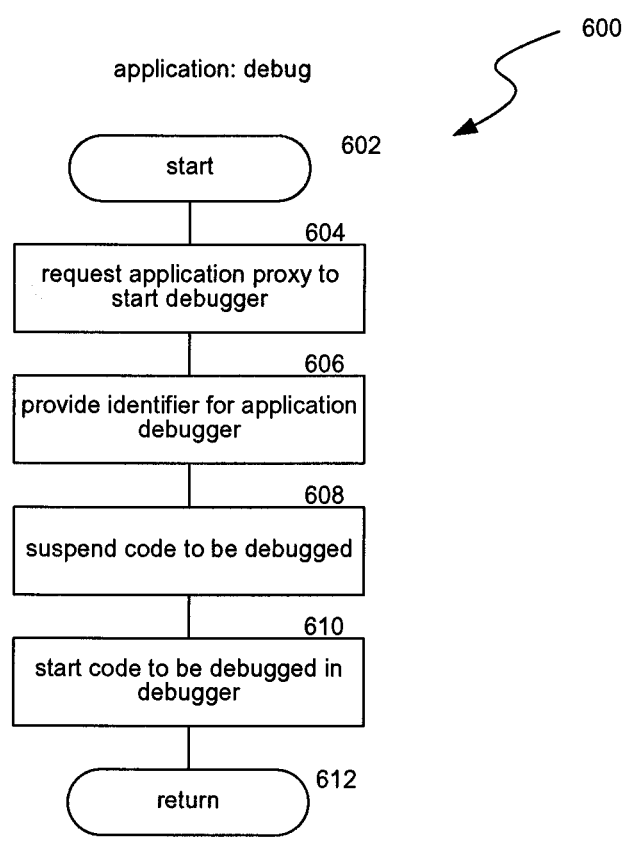
FIG. 6 is a flow diagram illustrating a debug routine invoked by an application in some embodiments of the facility.

FIG. 6 is a flow diagram illustrating a debug routine invoked by an application in some embodiments of the facility. An application can invoke the debug routine 600 when a user commands the application to begin debugging a component, such as an add-in. Alternatively, the application may invoke the method when an add-in to the application detects an error condition or a breakpoint. The routine begins at block 602.

At block 604, the routine requests the application proxy to start the debugger. The application proxy can command the IDE to start the debugger, such as by invoking a method associated with the VSTA API or another API associated with the facility.

At block 606, the routine provides an identifier for the application to the debugger. As an example, the routine can provide the application's process identifier ("process ID"). The debugger can use this identifier to properly associate the debugged code with the application.

At block 608, the routine suspends the code that is to be debugged. As an example, the routine suspends the add-in. In various embodiments, the routine can terminate the debugged code so that it can be restarted in the debugger.

At block 610, the routine starts the code in the debugger. The debugger can then associate the code with the application based on the identifier that was provided above by the logic associated with block 606.

At block 612, the routine returns.

Figure 7:
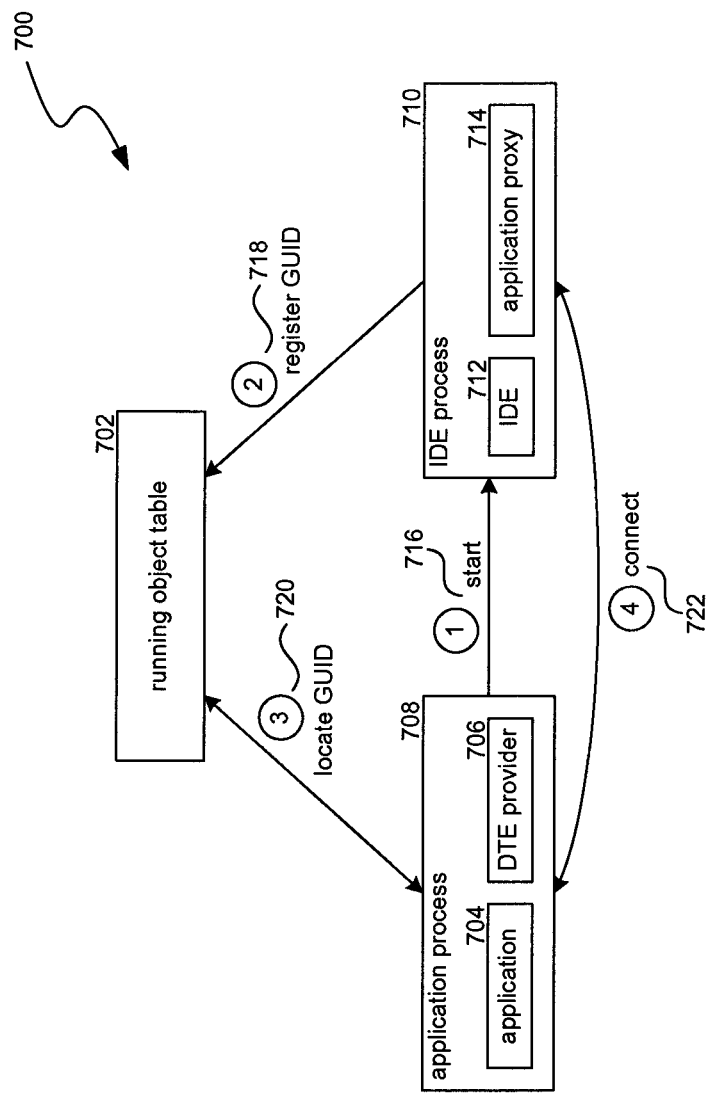
FIG. 7 is a block diagram illustrating additional components associated with the facility in various embodiments and an example of interactions between the components.

FIG. 7 is a block diagram illustrating additional components associated with the facility in various embodiments and an example of interactions between the components. The facility can include a running object table ("ROT") 702, application process 708, and IDE process 710.

The ROT can be a table or other component that applications can use to register. Registering applications can indicate an application identifier ("application ID"), process ID, moniker, and other attributes. Other applications can determine which processes have registered with the ROT, such as by searching for application IDs, monikers, or other attributes.

The application process is a process that is associated with the application that starts another application, such as an IDE. As an example, the application process can be MICROSOFT WORD, MICROSOFT EXCEL, or other application. The application process is associated with an application 704 and DTE provider 706. The application 704 comprises components associated with the application, such as dynamic link libraries (commonly referred to as "DLLs") executable files, and so forth. A DTE provider is a component that an application can employ to communicate with an IDE. As an example, an application that desires to employ an automation mechanism, extensibility mechanism, or other features of an IDE may employ a DTE provider to do so.

The IDE process is a process that is associated with the process that application 704 starts, such as an instance of the IDE. The IDE process hosts an IDE component 712 and an application proxy component 714. The IDE component comprises one or more executable files and libraries, and implements the integrated development environment. The application proxy component is discussed above, such as in relation to FIG. 2A.

A possible flow of execution 700 will now be described with reference to FIG. 7. An application 704 can start an instance of the DTE provider 8706, such as by invoking a "CoCreate" method provided by an operating system, such as MICROSOFT WINDOWS. The CoCreate method can be used to create an instance of an object. The application may then invoke a Get_IDE method provided by the created DTE provider. A possible flow associated with the Get_IDE method is described below in relation to FIG. 8. When invoking the Get_IDE method, the application may provide parameters, such as an identification of the application (e.g., application ID, name, and so forth). The application can also provide other parameters, such as a desired version number, which features of the IDE are to be enabled or disabled, and so forth. The IDE may employ these parameters to customize itself.

The DTE provider may then start 716 the IDE. As an example, the DTE provider may start a VSTA component. When starting the VSTA component, the DTE provider may provide various parameters. As an example, the DTE provider may identify the application (e.g., by providing a process ID or application ID corresponding to the application that instantiated the DTE provider, name, and so forth) and a globally unique identifier ("GUID"). The DTE provider can generate the GUID, retrieve it from a table or other source, etc. The DTE provider can employ any identifier that can uniquely identify a started IDE instance, and not necessarily one that is globally unique. As an example, if the application process, IDE process, and ROT all operate on the same computer, the identifier may not be unique across all computing devices.

The IDE process may then create an object for handling communication with the DTE provider. This object can be called a DTE object (not illustrated). In various embodiments, the IDE component may itself communicate with the DTE provider. In other embodiments, the application proxy may communicate with the DTE provider. In some embodiments, the application may use a component other than the DTE provider to communicate with the IDE. The IDE process may then register 718 the IDE with the ROT and indicate the received GUID as a moniker that is associated with the IDE. In some embodiments, the IDE may register a component associated with it, such as a DTE object it creates.

The facility employs the unique identifier to uniquely identify an IDE instance that the application is to connect to so that, for example, the application doesn't connect to another instance of the IDE that was started by a different instance of the same or another application. As an example, two instances of MICROSOFT EXCEL may each start an instance of the IDE. In such a case, the second instance of MICROSOFT EXCEL could connect to the instance of the IDE that the first instance of MICROSOFT EXCEL started if it did not locate the IDE process corresponding to the unique identifier.

The IDE may then identify a portion of the registry that is associated with the particular IDE instance. As an example, the IDE may employ a portion of the registry associated with the application, version, or other attributes the DTE provider indicated as parameters. By employing different portions of the registry, the IDE can customize itself based on the received parameters. Thus, the registry can have multiple portions allocated for different varieties of IDEs, such as for MICROSOFT VISUAL STUDIO, MICROSOFT WORD, MICROSOFT EXCEL, or any application that employs a customized IDE.

The application may then locate 720 the GUID in the ROT. As an example, the application may search for the GUID in the ROT or employ an API provided by the ROT to locate the identified GUID. Upon doing so, the application can determine the IDE's process ID or other identifier for the instance of the IDE the application started. The application can then connect 722 to the IDE instance. As an example, the application can invoke various methods provided an API associated with the IDE, such as to customize its features.

Although the illustrated and discussed embodiment describes an application as starting an IDE, the application can start other applications in various embodiments.

Figure 8:
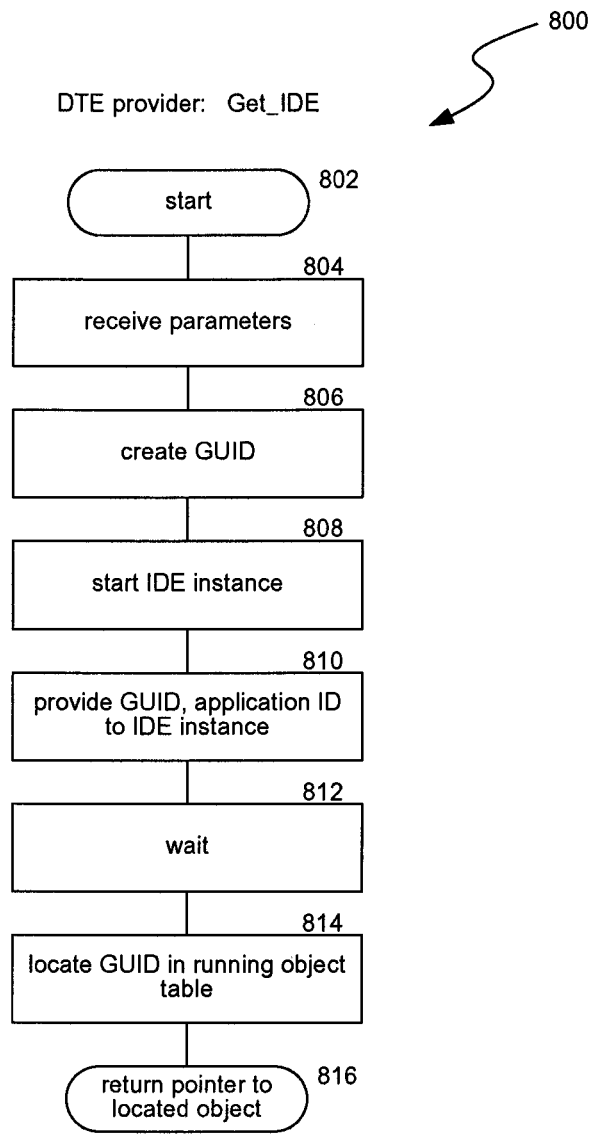
FIG. 8 is a flow diagram illustrating a Get_IDE routine invoked by the facility in various embodiments.

FIG. 8 is a flow diagram illustrating a Get_IDE routine invoked by the facility in various embodiments. A DTE provider can invoke the routine 800, such as when it is requested by an application to create an IDE instance. The routine begins at block 802.

At block 804, the routine receives various parameters. As examples, the routine can receive an identification of the application that instantiated the DTE provider (e.g., a process ID, name, and so forth), version number of the IDE instance that is desired, features or functions to provide or hide, and so forth.

At block 806, the routine creates a unique identifier. As an example, the routine creates a GUID. In various embodiments, the routine can look up a unique identifier to use.

At block 808, the routine starts an IDE instance. As an example, the routine may invoke an executable file that loads various libraries (e.g., DLLs) associated with the IDE. The routine may provide an indication of the application's identifier, GUID, and so forth. In some embodiments, the routine may provide these parameters when starting the IDE. In other embodiments, such as in the illustrated embodiment at block 810, the routine may provide the parameters after starting the IDE.

At block 812, the routine may wait for the IDE to start. The routine may wait for a specified period of time or may receive a notification that the IDE has started.

At block 814, the routine locates the GUID in the ROT. As an example, the routine may cycle through all monikers in the ROT or may invoke a search routine provided by an API, such as an API associated with the ROT. Upon locating the GUID, the routine may retrieve an object pointer or process ID that the application can employ to control the IDE.

At block 816, the routine returns the object pointer or process ID the routine retrieved from the ROT.

Figure 9:
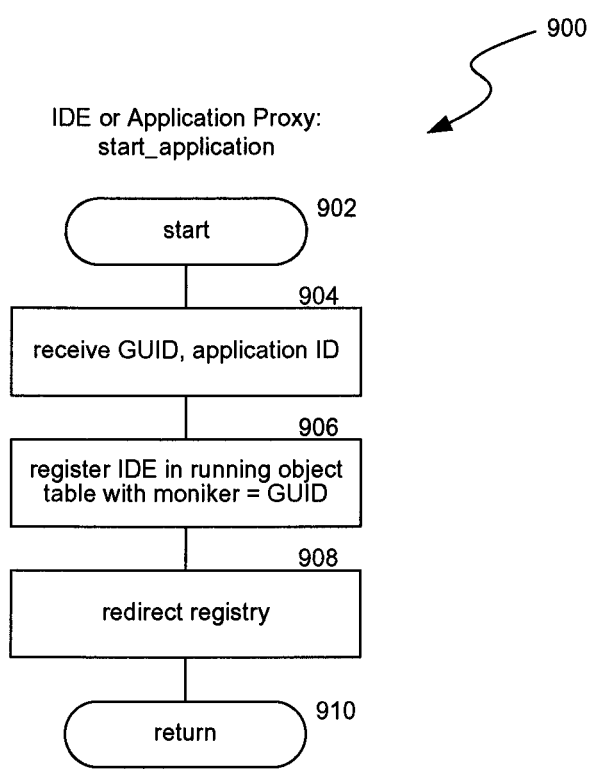
FIG. 9 is a flow diagram illustrating a start_application routine invoked by the facility in various embodiments.

FIG. 9 is a flow diagram illustrating a start_application routine invoked by the facility in various embodiments. An IDE or application proxy component can invoke the start_application routine 900, such as when the IDE starts. The routine begins at block 902.

At block 904, the routine receives parameters, such as indications of a GUID and application identifier.

At block 906, the routine registers that started instance, such as in a ROT. As an example, the routine registers the started instance's process ID, GUID, and so forth. The GUID can be registered in the ROT as the process's moniker so that other components can locate the process by its moniker.

At block 908, the routine redirects the registry. As an example, the routine causes the IDE to use a portion of the registry that is appropriate for the version or features that apply to the started instance of the IDE. At block 910, the routine then returns.

Figure 10:
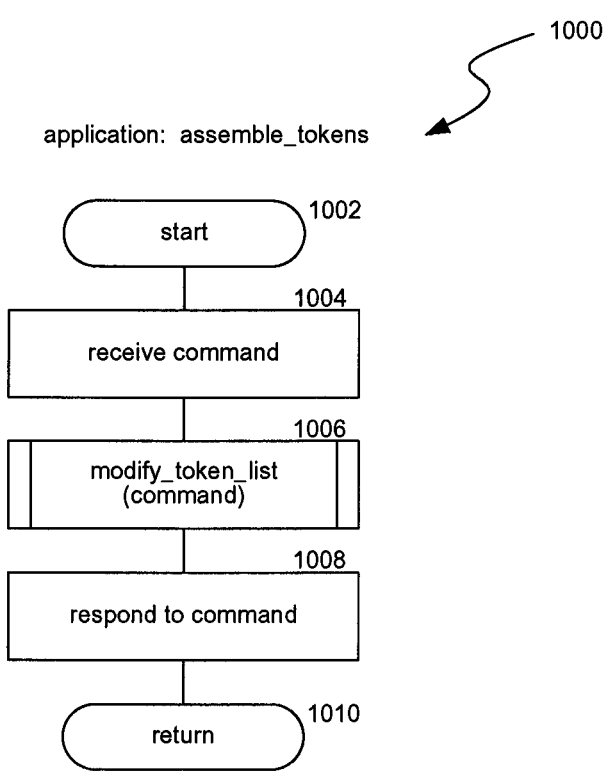
FIG. 10 is a flow diagram illustrating an assemble_tokens routine invoked by the facility in various embodiments.

FIG. 10 is a flow diagram illustrating an assemble_tokens routine invoked by the facility in various embodiments. A controlling application can invoke the routine 1000 to assemble a set of tokens, such as when a user commands the controlling application to take an action. The routine begins at block 1002.

At block 1004, the routine receives an indication of a command. As an example, the routine receives an indication of the command the user selected. Examples of commands include selecting a portion of a document, viewing online help, opening or closing windows, and so forth.

At block 1006, the routine invokes a modify_token_list subroutine. The routine may provide the received command indication to the subroutine. The modify_token_list subroutine is described in further detail immediately below in relation to FIG. 11.

At block 1008, the routine responds to the command. As an example, the routine takes the action the command indicates.

At block 1010, the routine returns.

In various embodiments, the assembled set of tokens can include code (e.g., source code) that the controlling application determines could be useful for the user to employ in starting to develop code. As an example, when a user desires to create a function for MICROSOFT EXCEL, the application can create a function template that, when provided to the IDE, will be inserted into a relevant portion of a code editor.

Figure 11:
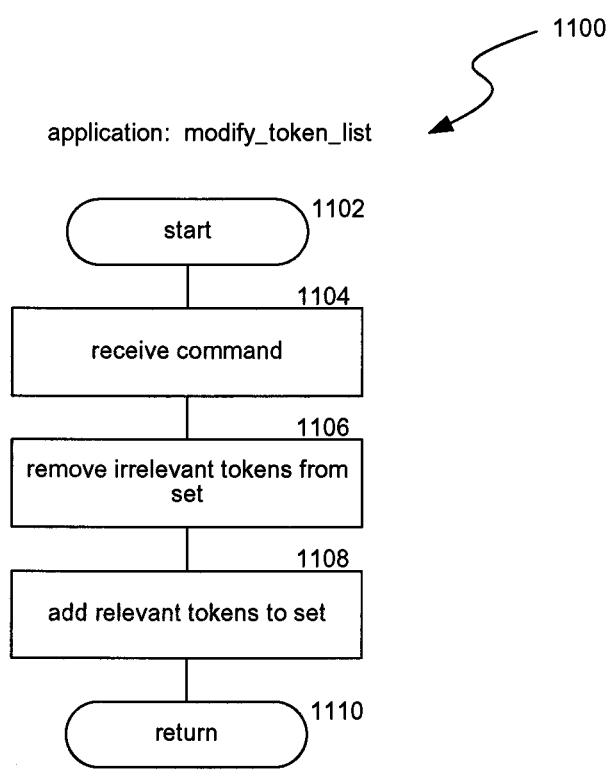
FIG. 11 is a flow diagram illustrating a modify_token_list routine invoked by the facility in various embodiments.

FIG. 11 is a flow diagram illustrating a modify_token_list routine invoked by the facility in various embodiments. A controlling application can invoke the routine 1100 to modify a token list, such as while assembling a set of tokens. The routine begins at block 1102.

At block 1104, the routine receives an indication of a command. As an example, the routine receives an indication of a command the user selected.

At block 1106, the routine can remove tokens that could be irrelevant when the command is complied with. As an example, when a routine closes a window, tokens associated with that window may no longer be relevant. Thus, the routine can remove the irrelevant tokens from the set of tokens.

At block 1108, the routine can add relevant tokens to the set of tokens. As an example, when the user opens a window, the routine can add tokens associated with that window to the set of tokens.

In various embodiments, the routine can determine whether tokens are relevant based on a set of rules or mapping table. The set of tokens can be implemented as a bit field, list, or any other data structure.

At block 1110, the routine returns.

Figure 12:
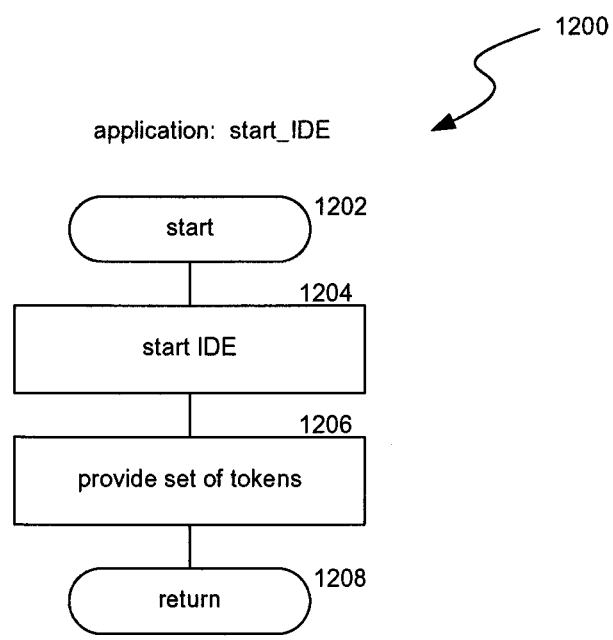
FIG. 12 is a flow diagram illustrating a start_IDE routine invoked by the facility in various embodiments.

FIG. 12 is a flow diagram illustrating a start_IDE routine invoked by the facility in various embodiments. The controlling application or an associated component (e.g., a DTE provider) can invoke the routine 1200 when starting the IDE. The routine begins at block 1202.

At block 1204, the routine starts the IDE. At block 1206, the routine provides the assembled set of tokens to the IDE.

At block 1208, the routine returns.

Figure 13:
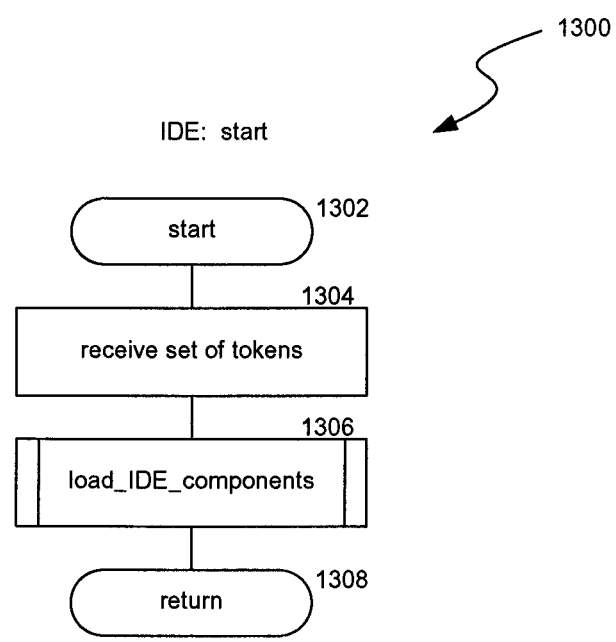
FIG. 13 is a flow diagram illustrating a start routine invoked by the facility in various embodiments.

FIG. 13 is a flow diagram illustrating a start routine invoked by the facility in various embodiments. The IDE can invoke the start routine 1300 when it starts. The routine begins at block 1302.

At block 1304, the routine receives a set of assembled tokens.

At block 1306, the routine invokes a load_IDE_components subroutine to load components associated with the IDE. The load_IDE_components subroutine is described in further detail below in relation to FIG. 14.

At block 1308, the routine returns.

Figure 14:
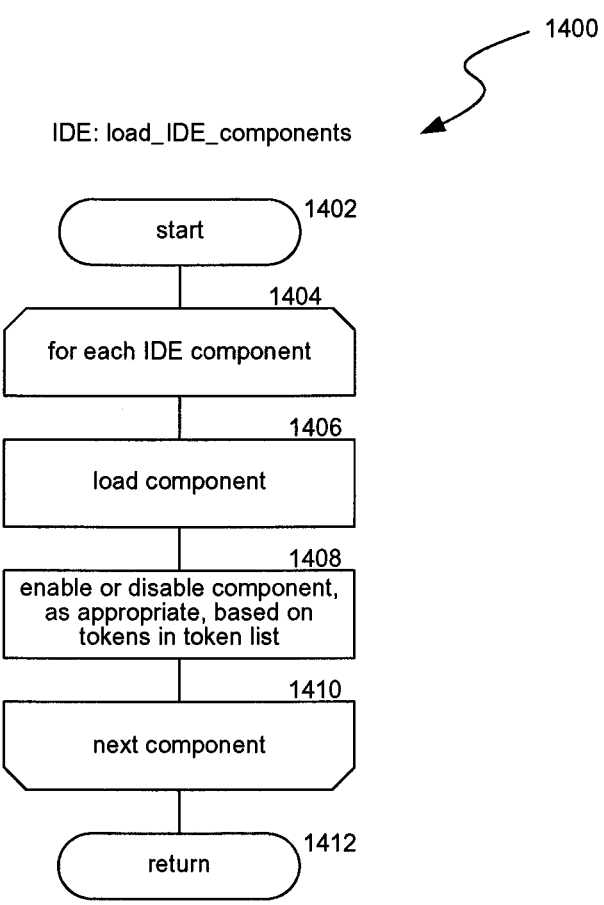
FIG. 14 is a flow diagram illustrating a load_IDE_components routine invoked by the facility in various embodiments.

FIG. 14 is a flow diagram illustrating a load_IDE_components routine invoked by the facility in various embodiments. The IDE invokes the load_IDE_components routine 1400 to load its components. Examples of the IDE's components include windows, menus, toolbars, tool windows, help, editor, and so forth. These components can be selectively enabled or disabled based on the assembled set of tokens. The routine begins at block 1402.

Between the loop of blocks 1404 and 1410, the routine enables or disables each component, as indicated by the assembled set of tokens. At block 1404, the routine selects an IDE component to load.

At block 1406, the routine loads the selected component.

At block 1408, the routine enables or disables the loaded component, as appropriate, based on the assembled set of tokens. As an example, the routine may employ a set of rules or a mapping table to determine whether or not the loaded feature should be enabled or disabled.

In various embodiments, the routine may determine from the assembled set of tokens whether or not the component should be loaded, and then load the component accordingly. In such embodiments, the logic of block 1406 may be delayed until the routine has made a determination that the component should be loaded.

At block 1410, the routine selects another component. When all components have been processed, the routine continues at block 1412, where it returns. Otherwise, the routine continues at block 1406 with the selected component.

In various embodiments, the set of tokens is handled by components associated with the controlling and controlled applications.

Those skilled in the art will appreciate that the logic illustrated in the flow diagrams and described above may be altered in a variety of ways. For example, the order may be rearranged, substeps may be performed in parallel, shown logic may be omitted, or other logic may be included, etc. In various embodiments, the functionality provided by the facility can be adapted in such a way that alternate components provide portions of the described logic.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by a computing system for controlling features of a controlled application from a controlling application, comprising:
   collecting an indication of features of the controlled application into a set of tokens, wherein, each token in the set of tokens corresponds to a feature of the controlled application;
   starting the controlled application;
   reading configuration settings from a configuration file, the configuration settings based on one or more of: observed past interactions of a user and the user's network credentials;
   identifying, based on the configuration settings, features of the controlled application to be disabled, wherein the identified features correspond to one or more tokens in the set of tokens;
   altering the set of tokens to indicate the identified features of the controlled application to be disabled, the altering performed by removing the tokens from the set of tokens to which the identified features correspond; and
   providing the altered set of tokens to the controlled application, wherein the controlled application is configured to disable at least one feature of the controlled application based on the altered set of tokens.

2. The method of claim 1 further comprising sending a command to a process in which the controlled application executes.

3. The method of claim 2 wherein the command is to load a project.

4. The method of claim 2 wherein the command is to insert code into a code editor.

5. The method of claim 1 wherein the providing includes identifying an application that starts an integrated development environment so that the integrated development environment can customize itself.

6. A system for controlling features of a controlled application from a controlling application, comprising:
   a processor and memory;
   the controlling application executed by the processor is adapted for collecting a set of tokens, when a user of the controlling application selects a command associated with the controlling application,
   wherein, each token in the set of tokens corresponds to a feature of the controlled application; and
   wherein the set of tokens are collected by removing one or more tokens from a previous set of tokens based on a determination of whether a particular function of the controlled application is irrelevant to a command currently being performed by the system, wherein the determination of whether a particular function of the controlled application is irrelevant is based on a predicted state of the system after the system complies with the command; and
   the controlled application, when invoked by the controlling application and provided the collected set of tokens, disables at least one feature of the controlled application based on the collected set of tokens.

7. The system of claim 6 wherein the controlled application is an integrated development environment.

8. The system of claim 7 wherein the collected set of tokens further causes the integrated development environment to add code in a code editor.

9. The system of claim 7 wherein the integrated development environment has a graphical user interface.

10. The system of claim 6 wherein the controlling application generates source code for display in a code editor of the controlled application when collecting the set of tokens.

11. The system of claim 10 wherein the controlled application emits the source code in the code editor when the controlled application starts.

12. The system of claim 6 wherein the controlling application has a provider component for communicating with the controlled application.

13. The system of claim 12 wherein the provider component starts the controlled application.

14. A computer-readable storage medium having computer-executable instructions that, when executed, perform a method for controlling features of a controlled application from a controlling application, the method comprising:
   receiving from the controlling application an indication to load a component associated with the controlled application and a set of tokens, wherein the set of tokens is modified from an original set of tokens corresponding to features of the controlled application by:
   reading configuration settings from a configuration file; and
   identifying, based on the read configuration settings, one or more tokens of the set of tokens such that each identified token corresponds to one or more features of the controlled application to be enabled;
   determining whether the component to be loaded matches at least one of an identified one or more tokens corresponding tone or more features of the controlled application to be enabled; and
   only when the component to be loaded matches at least one of an identified one or more tokens, enabling the component,
   wherein the settings in the configuration file are based on one or more of: observed past interactions of a user and the user's network credentials.

15. The computer-readable storage medium of claim 14 further comprising loading the component.

16. The computer-readable storage medium of claim 14 further comprising inserting source code into a code editor associated with the controlled application when the identified one or more tokens of the set of tokens indicates that source code is to be inserted.

17. The computer-readable storage medium of claim 14 wherein a feature of the controlled application is disabled when it does not correspond to any of the identified one or more tokens of the set of tokens.

18. The computer-readable storage medium of claim 14 wherein the configuration file is a user-defined configuration file.

19. The computer-readable storage medium of claim 14 wherein the tokens corresponding to features of the controlled application correspond to at least one of: toolbars, window visibility, and color settings.

20. A method performed by a computing system for controlling features of a controlled application from a controlling application, comprising:

collecting an indication of features of the controlled application into a set of tokens, wherein, each token in the set of tokens corresponds to a feature of the controlled application;

identifying, based on one or more of: observed past interactions of a user and the user's network credentials, features of the controlled application to be modified, wherein the identified features correspond to one or more tokens in the set of tokens;

altering the set of tokens to indicate the identified features of the controlled application to be modified; and providing the altered set of tokens to the controlled application, wherein the controlled application is configured to modify at least one feature of the controlled application based on the altered set of tokens.

21. A method performed by a computing system for controlling features of an integrated development environment, the method comprising:

collecting, based on one or more of: observed past interactions of a user and the user's network credentials, a set of tokens corresponding to features of the integrated development environment; and providing the collected set of tokens to the integrated development environment;

wherein the integrated development environment is configured to, based on the presence or absence of tokens in the collected set of tokens, modify at least one feature of the integrated development environment, wherein the modifying comprises one of: enabling a feature, disabling a feature, inserting code into an editor, creating or opening projects, and changing stylistic features displayed in the integrated development environment.

22. A computer-readable storage medium having computer-executable instructions that, when executed, perform operations for controlling features of a controlled application from a controlling application, the method comprising, the operations comprising:

collecting an indication of features of the controlled application into a set of tokens, wherein, each token in the set of tokens corresponds to a feature of the controlled application;

identifying, based on one or more of: observed past interactions of a user and the user's network credentials, features of the controlled application to be modified, wherein the identified features correspond to one or more tokens in the set of tokens;

altering the set of tokens to indicate the identified features of the controlled application to be modified; and providing the altered set of tokens to the controlled application, wherein the controlled application is configured to modify at least one feature of the controlled application based on the altered set of tokens.

23. A computer-readable storage medium having computer-executable instructions that, when executed, perform operations for controlling features of a controlled application from a controlling application, the method comprising, the operations comprising:

collecting, based on one or more of: observed past interactions of a user and the user's network credentials, a set of tokens corresponding to features of the integrated development environment; and providing the collected set of tokens to the integrated development environment;

wherein the integrated development environment is configured to, based on the presence or absence of tokens in the collected set of tokens, modify at least one feature of the integrated development environment, wherein the modifying comprises one of: enabling a feature, disabling a feature, inserting code into an editor, creating or opening projects, and changing stylistic features displayed in the integrated development environment.

\* \* \* \* \*